United States Patent [19]

Puryear

[11] Patent Number: 4,463,916

[45] Date of Patent: Aug. 7, 1984

[54] SILENT AND SELECTIVE ANTI-REVERSE MECHANISM

[75] Inventor: John W. Puryear, Tulsa, Okla.

[73] Assignee: Brunswick Corporation, Skokie, Ill.

[21] Appl. No.: 503,647

[22] Filed: Jun. 16, 1983

Related U.S. Application Data

[63] Continuation of Ser. No. 342,078, Jan. 25, 1982, abandoned.

[51] Int. Cl.³ ............................................. A01K 89/01
[52] U.S. Cl. .................................. 242/84.2 A; 74/576
[58] Field of Search .................... 242/84.1 R, 84.2 R, 242/84.2 A, 84.21 A, 84.21 R, 84.5 A, 84.51 A; 188/82.3, 82.34, 82.4; 74/576

[56] References Cited

U.S. PATENT DOCUMENTS

| | | | |
|---|---|---|---|
| 1,811,073 | 6/1931 | Burdick | 74/576 |
| 3,489,365 | 1/1970 | Hull | 242/84.2 A |
| 3,836,092 | 9/1974 | Hull | 242/84.2 A |
| 3,974,978 | 8/1976 | Henze | 242/84.1 R |
| 4,300,730 | 11/1981 | Carlson et al. | 242/84.2 R |
| 4,323,203 | 4/1982 | Neufeld | 242/84.5 A |

Primary Examiner—Billy S. Taylor
Attorney, Agent, or Firm—John G. Heimovics

[57] ABSTRACT

Anti-reverse mechanism having an actuator (60) associated with the crankshaft (40) of a reel by means of a C-shaped part (90) of the actuator frictionally engaging the crankshaft and parts (92,94,96) of the actuator extending into interengagement with an anti-reverse pawl (54). The anti-reverse pawl is pivotally mounted at a location to coact with the actuator positioned at the rear of a face gear (42) mounted on an end of the crankshaft and extends beyond said face gear into a position for engagement with a pinion gear (19) on a center shaft (18) of the reel to prevent rotation of the center shaft.

12 Claims, 7 Drawing Figures

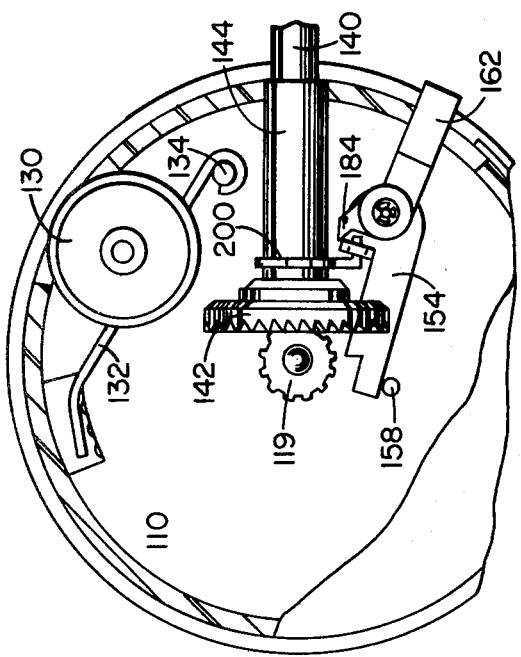
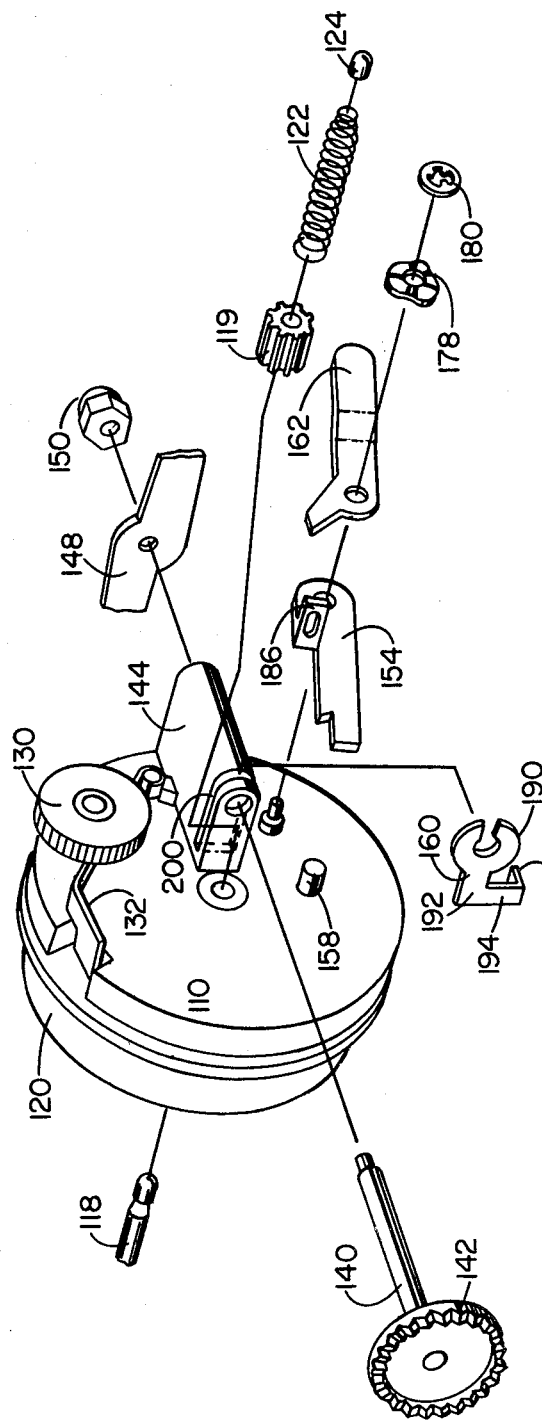
FIG. 6
FIG. 7

SILENT AND SELECTIVE ANTI-REVERSE MECHANISM

This application is a continuation of application Ser. No. 342,078, filed Jan. 25, 1982, now abandoned.

TECHNICAL FIELD

This invention relates to a spin cast type fishing reel and, more particularly, to a silent and selective anti-reverse mechanism.

BACKGROUND ART

Anti-reverse mechanisms for fishing reels are well known in the art. Typically, a pivoted pawl of such mechanism is positioned relative to a pinion gear in response to rotation of a center shaft of the reel which mounts the pinion gear. This type of structure severely limits assembly techniques and any discrepancies in manufacturing of associated parts causes tight spots as the crank handle of the reel is turned. Such tight spots result in resistance to rotation of the crankshaft of the reel which drives the center shaft and with the recent trend toward higher gear ratios the effect is greatly accentuated.

DISCLOSURE OF THE INVENTION

The present invention proposes the use of a simplified, lower cost, silent and selective anti-reverse mechanism for spin cast fishing reels wherein an anti-reverse pawl is uniquely located for actuation directly from the crankshaft by means of an actuator which clamps around the crankshaft for frictional engagement therewith. The actuator turns in the direction of crankshaft rotation but may slip relative thereto when the anti-reverse pawl is blocked in an inactive position by a selector lever or is in engagement with the pinion gear.

The present invention further proposes the mounting of the actuator directly to the crankshaft with a releasable, frictional drive engagement therebetween whereby the actuator is mounted without the use of additional parts, such as springs, washers and retaining clips.

The actuator for the anti-reverse pawl is directly mounted onto the crankshaft in frictional engagement therewith and, in one embodiment, is maintained in position lengthwise of the crankshaft by being located between a mounting boss for the crankshaft and a gear carried at an end of the crankshaft. In another embodiment of the invention, the mounting boss for the crankshaft is provided with an opening which functions to locate the actuator lengthwise of the crankshaft and which permits the actuator to extend into interengaging relation with the pawl.

BRIEF DESCRIPTION OF DRAWINGS

FIG. 6 is a rear elevational view, similar to FIG. 1 showing an alternate embodiment of the invention; and FIG. 7 is an exploded perspective view, similar to FIG. 5, of the alternate embodiment of the invention.

DESCRIPTION OF THE BASIC STRUCTURE AND OPERATION OF FISHING REEL

Figure 1:
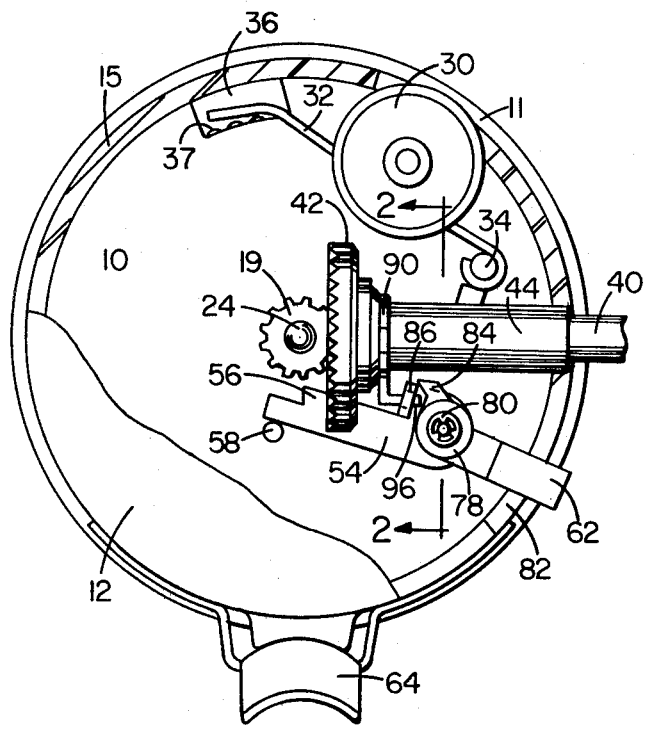
FIG. 1 is a rear elevational view of a spin cast type fishing reel with a portion of the rear cover broken away.
Figure 2:
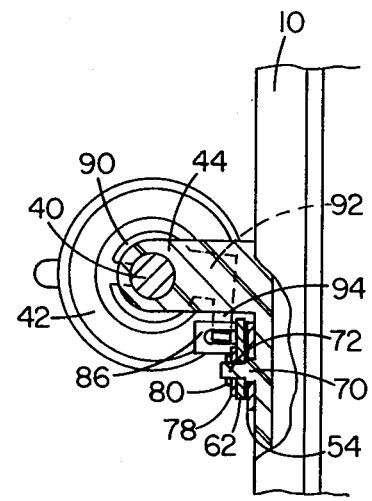
FIG. 2 is a vertical section, taken generally along the line 2—2 in FIG. 1.
Figure 5:
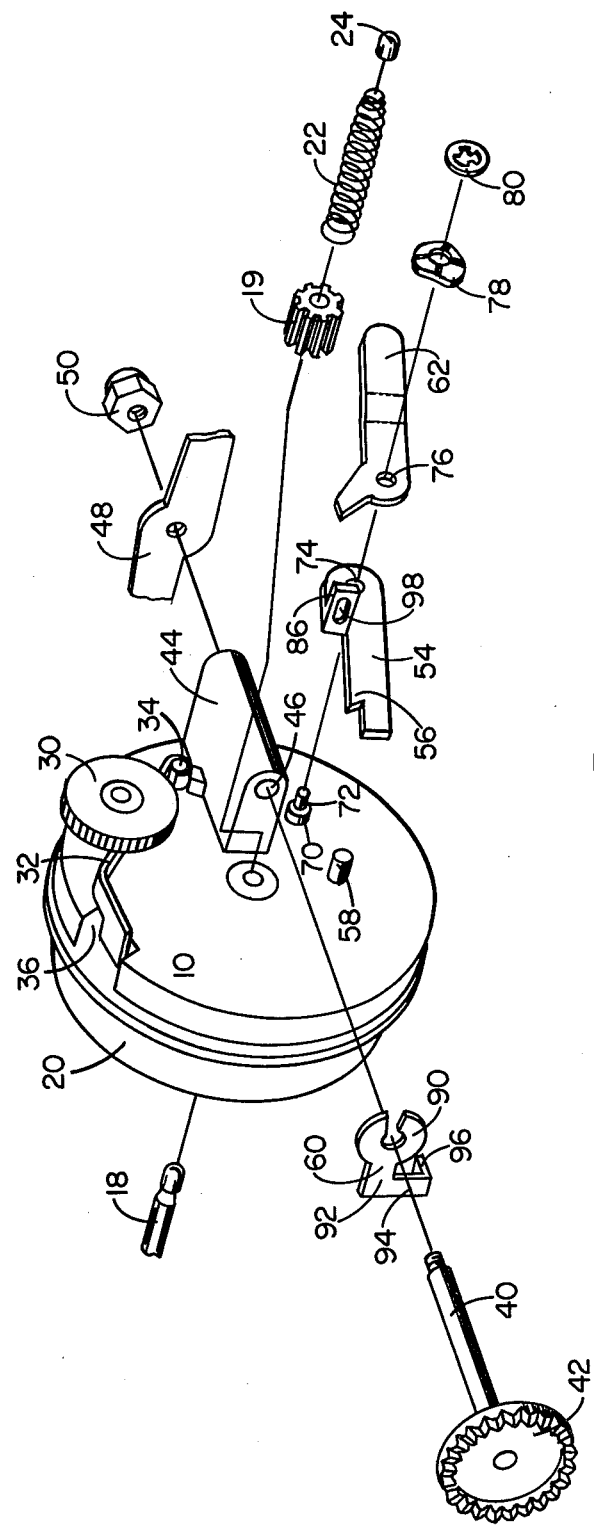
FIG. 5 is an exploded perspective view of a portion of the spin cast type fishing reel shown in FIGS. 1-4 and the anti-reverse mechanism of one embodiment of the present invention.

FIGS. 1 and 5 generally depict the basic structure of the spin cast type fishing reel to the extent required for an understanding of the present invention.

A generally cylindrical deck plate 10 is positionable within front and rear reel covers, with a rear edge of the front cover being identified at 11. A rear cover 12 attaches to the front cover and captures the deck plate 10 therebetween. The connection between the covers is achieved by a threaded connection between a flange of the front cover and a flange 15 of the rear cover which extends inwardly of the front cover flange.

The deck plate 10 rotatably mounts a center shaft 18 extending therethrough and which has a pinion gear 19 keyed thereto for rotation with the central shaft, but permitting longitudinal movement therebetween. The center shaft 18 has a spinner head 20 secured thereto which surrounds a line spool (not shown). The spinner head is normally urged to a position adjacent the deck plate by means of a coil spring 22 surrounding the center shaft 18 and which acts against the pinion gear 19 and a member 24 attached to a rear end of the center shaft.

Drag means for regulating the tension applied to the line spool includes a drive disc 30 rotatably mounted on the deck plate 10 and which has a stepped cam associated therewith and positioned for contact with a leaf spring 32. The leaf spring has one end captured on a pin 34 extending from the deck plate and the other end located within a notch 36 in the deck plate for engagement with a serrated edge 37 of the line spool.

Rotation is imparted to the center shaft 18 by rotation of a crankshaft 40 having a face gear 42 which meshes with the pinion gear 19. The crankshaft 40 is rotatably mounted within a mounting boss 44 extending outwardly from the deck plate and which may be formed integrally therewith. The boss has an opening 46 through which the crankshaft extends and an outer end of the crankshaft has a crank 48 mounted thereon and held in position by a nut 50 which threads onto an end of the crankshaft.

Figure 3:
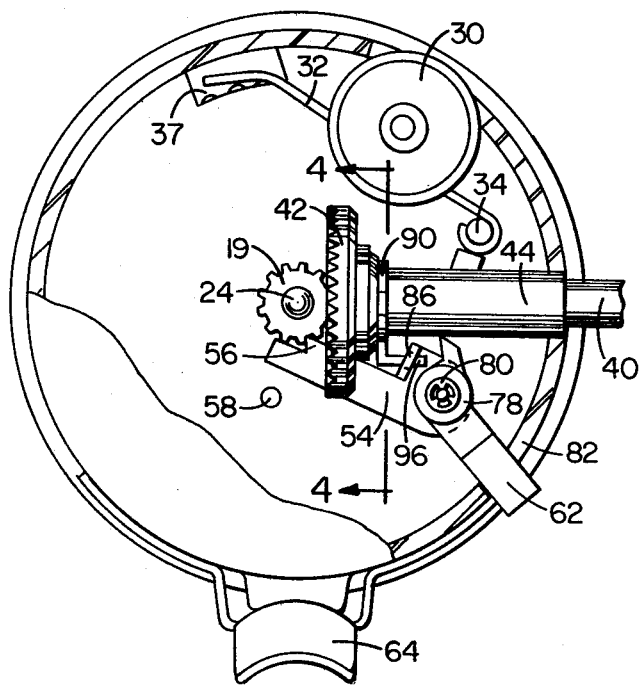
FIG. 3 is a view, similar to FIG. 1 showing the anti-reverse mechanism in a different position.
Figure 4:
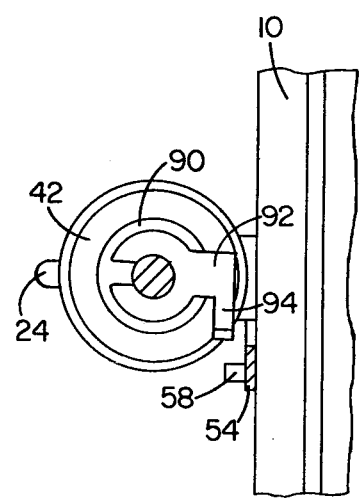
FIG. 4 is a vertical section, taken generally along the line 4—4 in FIG. 3.

An anti-reverse mechanism includes an anti-reverse device in the form of a pawl 54 pivotally mounted on the deck plate and having a shaped end 56 which, in an active position, can engage a tooth of the pinion gear 19, as shown in FIG. 3, to prevent counterclockwise rotation of the center shaft 18. In an inactive position, shown in FIG. 1, the pawl end 56 is away from the pinion gear 19 and the pawl engages an abutment pin 58 extending outwardly from the deck plate 10. An actuator 60, associated with the crankshaft 40, coacts with the pawl 54 to position the pawl in response to rotation of the crankshaft 40. A selector lever 62 is operable from the exterior of the reel for placing the pawl 54 in the inactive position shown in FIG. 1.

A rod-mounting structure 64 extends downwardly from the rear cover 12 for mounting of the reel on a rod as is known in the art.

DESCRIPTION OF THE PREFERRED EMBODIMENTS

One embodiment of the anti-reverse mechanism is shown in FIGS. 1 to 5. A multi-diameter mounting post extends from the deck plate 10 and has two different diameter sections, including a large diameter section 70 and a small diameter section 72, with a shoulder defined therebetween. The pawl 54 has an opening 74 thereof positioned on the large diameter section 70 and the selector lever 62 has an opening 76 positioned on the small diameter section 72 of the post. The thickness of the pawl is less than the length of the large diameter section of the post to have the pawl and selector lever out of frictional engagement, whereby the pawl and selector lever can rotate independently of each other. A tension washer 78 is mounted at an end of the small diameter section 72 of the mounting post and is held in compressive engagement with the selector lever by a cap 80 fixed to an end of the mounting post. With this construction, there is a clearance between the pawl 54 and the selector lever whereby the pawl is free to move independently of the selector lever and the tension washer 78 acts to retain the selector lever in one or the other of its selected positions.

An end of the selector lever 62 extends outwardly through an opening 82 in the rear cover whereby the selector lever may be positioned in the position of FIG. 3 to permit free movement of the anti-reverse pawl 54. The operative position of the selector lever 62 is shown in FIG. 1 wherein an arm 84 of the selector lever has moved into engagement with a tab 86 on the anti-reverse pawl 54 and caused pivoting of the pawl from the position of FIG. 3 to the inactive position shown in FIG. 1.

The center shaft 18 and crankshaft 40 are disposed on intersecting axes and with the face gear 42 on an end of the crankshaft meshing with the pinion 19. The anti-reverse pawl 54 is positioned to extend generally parallel to the axis of the crankshaft 40 and the pivot axis for the pawl defined by the mounting post is located to the rear of the face gear 42 and generally mid-way between the ends of the crankshaft. The actuator 60 converts rotation of the crankshaft to pawl movement. The actuator 60 has a C-shaped part 90 which frictionally clamps around the crankshaft 40 and is located lengthwise thereof by being positioned between the rear side of the face gear 42 and the adjacent end of the mounting boss 44 which mounts the crankshaft. The actuator has an arm 92 which extends radially from the part 90 and toward the face plate 10 with a connecting member 94 extending at a right angle from the arm and interconnecting with the anti-reverse pawl 54 through a turned end 96 engaging within an elongate slot 98 in the tab 86 of the pawl. It is within the scope of the invention to have a tab on the pawl engage within a slot formed in the actuator.

Rotation of the crankshaft 40 through frictional engagement with the actuator 60 causes limited rotation thereof with movement of the actuator end 96 in a relatively flat arc which closely follows the plane of pivoting of the anti-reverse pawl 54 whereby rotation of the crankshaft can be converted into pivotal movement of the pawl 54. There is only a slight variation between the planar movement of the pawl and arcuate movement of the actuator end 96 because of the limited movement and this is accommodated by the elongate slot 98. In the event the selector lever is positioned as shown in FIG. 1 to hold the anti-reverse pawl in an inactive position, the force exerted by the tension washer 80 on the selector lever 62 is greater than the frictional force tending to cause the actuator to follow the rotation of the crankshaft whereby rotation of the crankshaft is ineffective to cause movement of the anti-reverse pawl 54.

It will be evident that the actuator 60 can be associated with the crankshaft 40 prior to assembly of the crankshaft into the mounting boss 44.

Another embodiment of the invention is shown in FIGS. 6 and 7. In this embodiment, the structure which is the same as that of the embodiment of FIGS. 1 to 5 has been given the same reference numeral, with 100 added thereto.

In this embodiment, the actuator 160 is still located to the rear of the face gear 142 and mounted on the crankshaft 140. However, the mounting boss for the crankshaft 144 is modified to have a recess 200 of a width slightly greater than the thickness of the actuator 160, and which extends for a sufficient depth toward the deck plate 110 whereby the actuator arm 194 and the end 196 thereof are exposed for interengagement with the tab 186 on the pawl 154 in a manner similar to that described in the embodiment of FIGS. 1 to 5.

In this embodiment, the actuator 16, is located lengthwise of the crankshaft and, thereby located in associative relation with the pawl by the edges of the recess 200 in the mounting boss.

I claim:
1. In a spin cast type reel having a deck plate, a longitudinally extending center shaft and a crankshaft disposed on intersecting axes, gearing interconnecting said shafts including a pinion gear on the center shaft and a meshing face gear on an end of the crankshaft, the improvement comprising:
an anti-reverse device pivotally connected with a part of said reel for rotation about a substantially longitudinally extending axis and having a substantially flat body portion, a tab integral with and extending transversely to the plane of the flat body portion and an elongate slot in said tab;
an actuator for pivoting said anti-reverse device, said actuator including a flat C-shaped part which partially surrounds and frictionally clamps around the crankshaft intermediate the ends of the crankshaft, an arm extending radially from the flat C-shaped part and a connecting end extending from said arm transversely to the plane of the flat C-shaped part; said connecting end received in said elongate slot whereby movement of said actuator causes pivoting of said anti-reverse device.

2. The spin cast type reel of claim 1 wherein said anti-reverse device is a pawl pivotally mounted to the deck plate at a location adjacent an intermediate part of said crankshaft.

3. The spin cast type reel of claim 2 wherein said pawl has a length to extend laterally from the pivotal mounting past said face gear to said pinion gear.

4. The spin cast type reel of claim 1 wherein the deck plate rotatably mounts said center shaft and a mounting boss extends from said deck plate for rotatably mounting said crankshaft, said actuator being positioned on said crankshaft and mounted in captured relationship between the mounting boss and the face gear.

5. The spin cast type reel of claim 1 wherein the deck plate rotatably mounts said center shaft, a mounting boss extends from said deck plate for rotatably mounting said crankshaft, and an opening in said mounting boss exposes an intermediate length of said crankshaft, said actuator being mounted on said crankshaft at an intermediate length so that the arm from the C-shaped part extends outwardly beyond said mounting boss.

6. In a spin cast reel having a deck plate which rotatably mounts a center shaft having a pinion gear, a crankshaft with a gear meshing with said pinion gear, an anti-reverse device in the form of a pawl, an actuator for the pawl operable by rotation of the crankshaft, the improvement wherein:

said actuator has a first part frictionally engaging the crankshaft, an arm extending from the first part and a connecting member extending from said arm to said pawl;

said deck plate having a mounting post with sections of two different diameters;

said pawl extending in a direction generally parallel to the crankshaft and being pivotally mounted on the larger diameter section;

a selector lever pivotally mounted on the smaller diameter section and held spaced from said pawl by a shoulder between said sections of different diameter;

a tension washer on said post for frictionally holding said selector lever in a set position;

said pawl engaging the pinion gear to prevent reverse rotation of the crankshaft; and a surface on said lever engageable with said pawl.

7. The spin cast type reel of claim 6 wherein said actuator is formed of planar material having a part at least partially encircling said crankshaft.

8. The spin cast type reel of claim 6 wherein said deck plate has a mounting boss rotatably mounting said crankshaft, and said actuator is positioned on said crankshaft between the gear thereon and said mounting boss.

9. The spin cast type reel of claim 6 wherein said deck plate has a mounting boss rotatably mounting said crankshaft, an opening in said mounting boss, and said actuator being mounted on the part of the crankshaft exposed by said mounting boss opening, the edges of the opening maintaining the actuator positioned lengthwise of the crankshaft.

10. The spin cast type reel of claim 6 wherein the selector lever is operable from outside the reel for moving the pawl to an inactive position.

11. The spin cast reel of claim 6 wherein said pawl has a tab residing in a plane transverse to the axis of the crankshaft and an elongate slot is provided in the tab, said connecting member extending into the slot and causing the pawl to pivot upon rotation of the crankshaft.

12. The spin cast reel of claim 11 wherein the selector lever has an arm engageable with the tab to cause pivoting of the pawl to an inactive position upon actuation of the selector lever.

* * * * *